United States Patent
Whitfield et al.

(10) Patent No.: US 6,600,694 B1
(45) Date of Patent: Jul. 29, 2003

(54) DIGITAL SIGNAL PROCESSOR BASED TORPEDO COUNTER-MEASURE

(75) Inventors: Martin L. Whitfield, Goose Creek, SC (US); Donald P. Brutzman, Monterey, CA (US)

(73) Assignee: The United States of America as represented by the Secretary of the Navy, Washington, DC (US)

( * ) Notice: Subject to any disclaimer, the term of this patent is extended or adjusted under 35 U.S.C. 154(b) by 0 days.

(21) Appl. No.: 10/210,238

(22) Filed: Jul. 31, 2002

(51) Int. Cl.[7] .............................................. H04K 3/00
(52) U.S. Cl. ........................................................ 367/1
(58) Field of Search ............................ 367/1; 434/6, 10

(56) References Cited

U.S. PATENT DOCUMENTS

| | | | | |
|---|---|---|---|---|
| 4,214,313 A | * | 7/1980 | Geren et al. ..................... | 367/1 |
| 4,759,067 A | * | 7/1988 | Page ............................... | 434/6 |
| 4,986,755 A | * | 1/1991 | Johnson .......................... | 367/1 |
| 4,991,144 A | * | 2/1991 | Geren et al. ..................... | 367/1 |
| 5,012,452 A | * | 4/1991 | Johnson et al. ................. | 367/1 |
| 5,062,083 A | * | 10/1991 | Geren et al. ..................... | 367/1 |
| 5,247,894 A | * | 9/1993 | Haisfield et al. ................ | 367/1 |
| 5,268,875 A | * | 12/1993 | Charlton .......................... | 367/1 |

* cited by examiner

*Primary Examiner*—Ian J. Lobo
(74) *Attorney, Agent, or Firm*—Donald E. Lincoln

(57) ABSTRACT

A system for producing a decoy to enable a target to avoid a homing torpedo that uses a sonar ping signal for homing in on the target comprises a transducer that operates in a receive mode in which it receives sonar signals and produces corresponding electrical signals and in a transmit mode in which it emits a sonar return pulse. A digital signal processor connected to the transducer is arranged to analyze the electrical signals corresponding to sonar signals received by the transducer and to determine whether they were emitted by the homing torpedo. The digital signal. processor is further arranged to switch the transducer to the transmit mode in response to receipt of a sonar ping signal from the homing torpedo and to cause the transducer to transmit a return pulse that acts as a decoy signal to the homing torpedo.

2 Claims, 3 Drawing Sheets

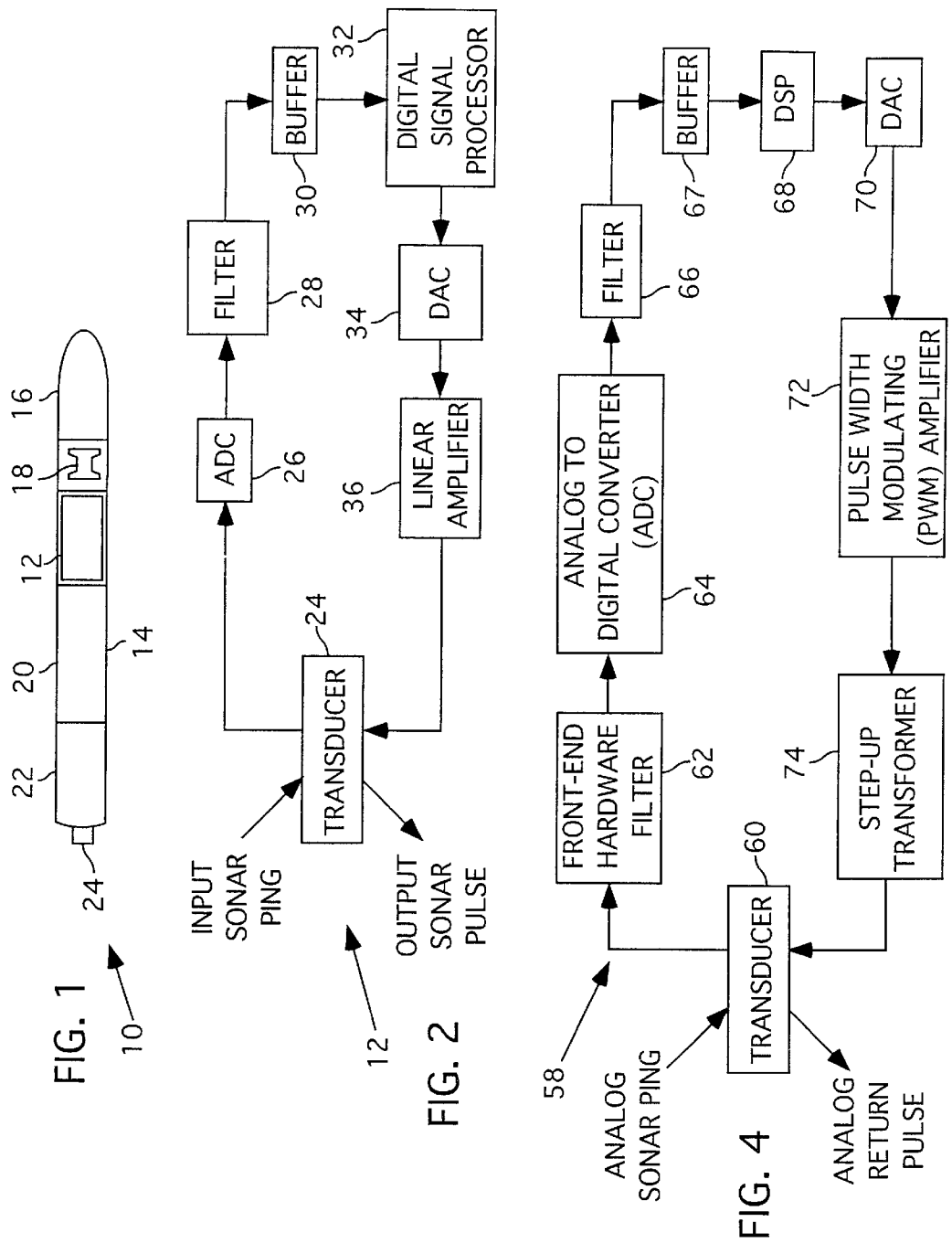

DIGITAL SIGNAL PROCESSOR BASED TORPEDO COUNTER-MEASURE

FIELD OF THE INVENTION

This invention relates to the field of signal generators, and in particular signal generators for producing decoy signals to a homing torpedo. In even more particularity, the subject invention relates to a signal generating method using basic Digital Signal Processing (DSP) techniques to effectively enable Counter-Measures (CM) so that the torpedo can be avoided.

BACKGROUND OF THE INVENTION

The days have long since passed when a submarine launched three or four torpedoes, each separated by half a degree of bearing, in order to ensure at least one hit on the target. Modern torpedoes incorporate powerful sonar seekers with advanced signal processing and computer technology to search for (and destroy) their targets. These torpedoes are faster and more maneuverable than any submarine or surface ship. While early acoustic torpedoes relied upon a target's radiated noise, today's torpedo uses its own active sonar to detect the target or the targets wake. The most advanced of these weapons uses target motion information from the Doppler shift of its sonar ping to eliminate false targets and increase the signal to noise ratio for better detection.

Torpedo sonar systems operate at relatively high frequencies (compared to a search sonar) in order to obtain the resolution necessary for target classification. One trade off is that higher frequency means higher absorption of the sonar energy in seawater, which limits the detection range of the weapon. Frequently the target knows that a torpedo has been launched and has time to initiate evasive action. Torpedo countermeasures are then deployed to prevent the torpedo from detecting and homing on the evading ship. While there are many different kinds of torpedo countermeasures employed by the world's navies, they all try to accomplish two things: attract the torpedo's attention (present a false target) and reduce the torpedo's ability to detect the true target.

Most of these countermeasure devices are simple noisemakers, programmed to produce noise at a high sound pressure level. Just as it is difficult to carry on a normal conversation when there is loud music playing nearby, these countermeasure devices increase the ambient noise level, which in turn decreases the torpedo's signal to noise ratio and lowers the probability that the torpedo will detect the target.

The major drawback to noisemakers is that their signal typically remains the same during its entire active lifetime. A particular countermeasure may be very effective against one particular type of torpedo but may not be effective against another. However, there is usually no way for a noisemaker to change its output after it has been deployed from the target ship, particularly since acoustic communications are blocked by the noise itself. There are over two dozen kinds of torpedoes available on the open market, manufactured by countries such as the U.S., U.K., Germany, Italy, France, Russia, China, and North Korea. All of these weapons have very different sonar characteristics, which makes it difficult to produce a noisemaker that will be effective against them all.

SUMMARY OF THE INVENTION

Digital signal processor (DSP) technology as used in the present invention solves many of the problems associated with prior countermeasure devices. The overall goal of the present invention is to provide a torpedo countermeasure design that is superior in both performance and cost effectiveness when compared to previous countermeasures. A primary consideration is use of inexpensive commercial DSP technology in a countermeasure design that is able to recognize and properly respond to torpedo sonar signals.

The entire electrical/electronic equipment package is contained within a single waterproof housing of sufficient strength to operate at tactical water depths. An external mechanical flotation system is attached and can be preset prior to launch to maintain the encased equipment package at the appropriate water depth. Further, electrical and electronic connections penetrate the waterproof hardware casing, thus permitting battery charging and complete updates of software and firmware, so that the acoustic and tactical capabilities of the device can be improved over time with minimal expense and minimal hardware modifications.

An object of the present invention is to overcome the disadvantages of the prior art by providing a torpedo countermeasure that produces a signal that attracts the technically sophisticated homing torpedoes.

An object of the invention is to provide a countermeasure that uses a single transducer to detect a torpedo sonar ping, analyze its characteristics (frequency, pulse length, etc.), and, using the transducer, transmit a return pulse that will be interpreted by the torpedo as the refection off a valid target.

Accordingly, a system according to the invention for producing a decoy signal to enable a target to avoid a homing torpedo that uses a sonar ping signal for homing in on the target comprises a transducer arranged to operate in a receive mode in which it receives sonar signals and produces corresponding electrical signals and in a transmit mode in which it emits a sonar return pulse. The invention further comprises a digital signal processor connected to the transducer. The digital signal processor is arranged to analyze the electrical signals corresponding to sonar signals received by the transducer and to determine whether they were emitted by the homing torpedo. The digital signal processor is further arranged to switch the transducer to the transmit mode in response to receipt of a sonar ping signal from the homing torpedo and to cause the transducer to transmit a return pulse that acts as a decoy signal to the homing torpedo.

The system according to the invention preferably further comprises an analog to digital converter connected to the transducer to receive analog signals therefrom and to output corresponding digital signals and a filter connected between the analog to digital converter and the digital signal processor. The filter is arranged to determine whether signals input thereto from the analog to digital converter are within a defined frequency range.

The system according to the invention preferably further comprises a digital to analog converter arranged to receive digital signals output from the digital signal processor and produce corresponding analog signals and an amplifier connected between the digital to analog converter and the transducer.

The invention preferably further comprises a front-end filter connected to the transducer and arranged to pass signals having frequencies less than a predetermined frequency, an analog to digital converter connected to receive signals passed by the front-end filter and to output corresponding digital signals and a filter connected between the analog to digital converter and the digital signal processor, the filter being arranged to determine whether signals input thereto from the analog to digital converter are within a defined frequency range.

A method according to the invention for producing a decoy signal to enable a target to avoid a homing torpedo that uses a sonar ping signal for homing in on the target comprises the steps of (a) receiving sonar signals with a transducer that produces electrical signals corresponding to the sonar signals, (b) determining whether the electrical signals have frequencies that are within a defined frequency range (c) processing the electrical signals to determine whether they correspond to sonar ping signals, (d) calculating an estimate of the torpedo's motion, (e) calculating a transmit time for transmitting a decoy signal, (f) calculating a Doppler frequency for the decoy signal such that the decoy signal will appear to the homing torpedo to be a return pulse from the target and (g) switching the transducer to a transmit mode to transmit the decoy signal having the calculated Doppler frequency at the calculated transmit time.

Other objects and many of the advantages will be readily appreciated as the subject invention becomes better understood by reference to the following detailed description, when considered in conjunction with the accompanying drawings.

BRIEF DESCRIPTION OF THE DRAWINGS

FIG. 1 illustrates a torpedo countermeasure system;

FIG. 2 is a block diagram of a first embodiment of circuitry according to the invention that may be included in an electronics module that may be included in the torpedo countermeasure of FIG. 1;

FIG. 4 is a block diagram of a second embodiment of circuitry that may be included in the electronics module of FIG. 1.

DETAILED DESCRIPTION OF THE INVENTION

Figure 3:
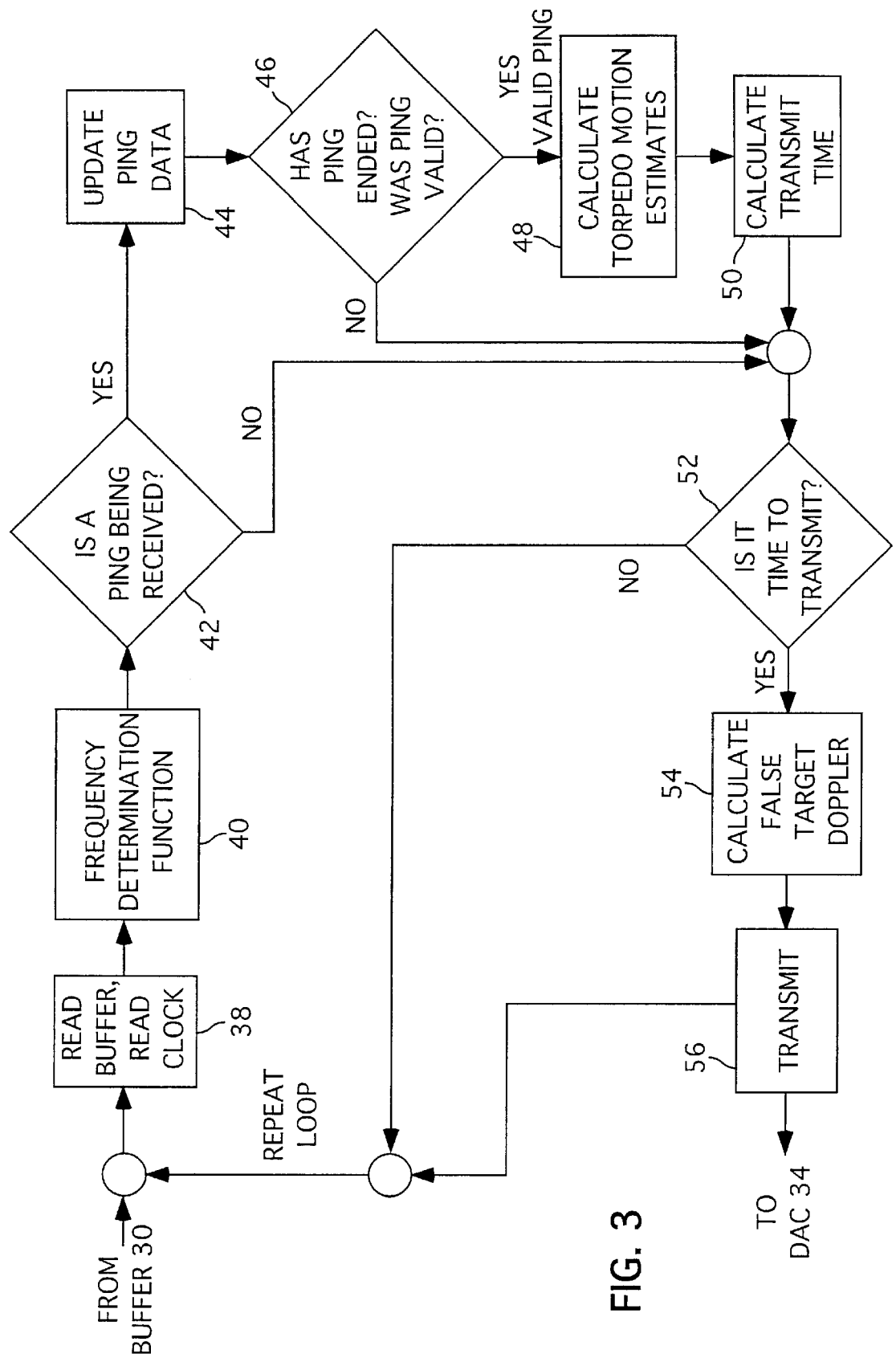
FIG. 3 is a signal flow diagram for the circuitry of FIG. 2.

This disclosure describes a torpedo countermeasure. Specific circuitry and components that may be included therein are disclosed to provide a thorough description of the invention. However, it will be apparent that the present invention may be practiced without these specific circuits and components. Well-known components of the present invention are shown in block diagram form, rather than in detail, to avoid unnecessarily obscuring the invention.

As shown in FIG. 1, a torpedo countermeasure 10 includes an electronics module 12 placed in a watertight enclosure 14. The torpedo countermeasure 10 also includes a float 16, a spool and tether assembly 18, an electrical power system 20, which may be a conventional battery package, a payload section 22 and a transducer 24. After the torpedo countermeasure 10 is launched into water, the float 16 is released from the enclosure 14. The float 16 rises to the surface and supports the enclosure 14 via the spool and tether assembly 18. This invention is directed in particular to the electronics module 12 and algorithms used thereby.

The torpedo countermeasure 10 might be deployed from a submarine (not shown) when the targeted submarine detects an inbound torpedo. The torpedo countermeasure 10 listens for the torpedo's acoustic incoming sonar ping, analyzes the ping, and after obtaining information such as frequency, amplitude and pulse length, the torpedo countermeasure 10 sends out a sonar pulse similar to an actual return from a target. This false target return fools the torpedo by tricking the weapon into thinking there was a valid target in the direction of the torpedo countermeasure 10, while the evading submarine slips away.

Referring now to FIGS. 1 and 2, the transducer 24 is arranged to receive an input sonar ping when the torpedo countermeasure 10 is operating in a receive mode. The transducer 24 acts as hydrophone when receiving the input solar ping. The countermeasure 10 preferably includes a single transducer 24 that is used both for receiving and sending sonar signals. Transducers suitable for use in the countermeasure 10 are typically made of piezoelectric ceramic materials. Pressure variations in an input acoustic signal cause the piezoelectric crystal to produce a small time-varying voltage characteristic of the input signal. When an external time-varying voltage is applied to the piezoelectric crystal, it vibrates and produces sound waves having the same frequency as that of the applied voltage.

After receiving the input sonar ping, the transducer 24 produces an analog electrical signal that is input to an analog to digital converter (ADC) 26 that converts the analog signal into a corresponding a digital signal. The digital signal is then input to a filter circuit 28 that is arranged to determine the frequency of signals input thereto. Signals output from the filter circuit 28 are buffered by a buffer circuit 30 and then input to a digital signal processor (DSP) 32 that analyzes the signal to determine whether it has come from a torpedo (not shown).

The countermeasure 10 also operates in a transmit mode in which the DSP 32 provides a signal to a digital to analog signal converter (DAC) 34 that produces corresponding analog signals. These analog signals are input to a linear amplifier 36 that is connected to the transducer 24. Upon receipt of the signals from the amplifier 36, the transducer 24 produces an output sonar pulse.

FIG. 3 illustrates a logic flow diagram for the DSP 32 circuitry of FIG. 1. In the receive mode, digital signals from the buffer 30 are input to the DSP 32. The DSP 32 executes a read buffer, read clock step 38 in which a signal value is read from the buffer 30 and stored as a variable. The DSP 32 also reads and stores a time corresponding to the signal from the buffer 30. The DSP 32 analyzes the stored signal with a frequency determination function 40 to determine its frequency. After the frequency is determined, the DSP 32 executes a ping determination step 42 to determine whether the stored signal represents a torpedo sonar ping or merely background noise.

If the signal is found to represent a torpedo sonar ping, then an update ping data step 44 is performed. The DSP 32 includes a memory (not shown) adequate to store ping parameters such as ping length, ping start and stop time and average frequency. If the stored signal is not found to represent a torpedo ping, then the DSP 32 evaluates whether it is time to transmit. If a torpedo sonar ping is being received, the DSP 32 executes a step 46 to determine whether the ping has ended and whether the ping was valid. At the end of a valid ping the DSP 32 performs a calculate torpedo motion estimate step 48 and also performs a calculate transmit time step 50.

The DSP 32 next performs a step 52 in which to determine whether it is time to transmit. If is time to transmit, the DSP 32 executes a calculate false target Doppler step 54 in which the Doppler shifted frequency for a return pulse to the torpedo is calculated. The DSP 32 then does a transmit step 56 in which it sends a signal to the DAC 34 to initiate transmittal of a pulse that the incoming torpedo may interpret as being an echo from a fleeing target.

While the return pulse is being transmitted the ADC 26 is turned off to avoid confusion between the return pulse being transmitted and the incoming sonar ping. If it is not time to transmit, the DSP reads a new signal value from the buffer 30 and repeats the steps described above until it is time to transmit a return pulse.

Determining the frequency of the incoming sonar ping typically includes the step of performing a baseband frequency conversion performed on the digital signal output of the ADC 26 to filter out the carrier signal. The frequency of the resulting data can be determined by using methods such as a discrete time Fourier transform, a fast Fourier transform, a zero-crossings algorithm, or hybrid methods that include both a zero-crossings algorithm and a fast Fourier transform. All of these techniques for determining the frequency of a sonar ping signal are well-known in the art and are not described in detail herein.

FIG. 4 is a block diagram of a second embodiment of a countermeasure electronics module 58 according to the invention. The electronics module 58 includes a transducer 60 that may be substantially identical to the transducer 24 of FIG. 1. In the receive mode, the transducer 60 produces an analog electrical signal in response to an incident sonar ping. The analog signal is input to a front-end filter 62.

The front-end filter 62 includes a low-pass filter that preferably is designed to pass and amplify signals less than 100 kHz. The front-end filter 62 matches impedance and measures voltages produced by the transducer 60 when it is receiving the external acoustic signals. Signals of interest include the input sonar ping by an incoming torpedo. Initial amplification raises the low-level voltages to a signal of suitable strength for further digital processing. Initial hardware filtering eliminates unwanted low-frequency components and improves signal-to-noise ratio.

The filtered signal is then digitized by an ADC 64. A suitable device for this application is commercially available from National Semiconductor as ADC model 14061, which is a 14-bit A/D converter with a power rating of 390 mW. The conversion rate range is from 312.5 kHz to 2.5 MHz, which means the signal sampling rate will also be in this range. Using a zero-crossings algorithm in which the sampling rate is ten times the maximum frequency of interest gives frequency coverage of up to 250 kHz.

Signals output from the ADC 64 are input to a filter 66 that is preferably formed as a finite impulse response (FIR) device. Signals output from the filter 66 pass through a buffer 67 and are then input to a DSP 68 for processing.

A general-purpose digital signal processor such as the Motorola DSP56301 processor may be used as the DSP 68. The Motorola DSP56301 processor may also be used for multimedia and telecommunication applications such as videoconferencing and cellular telephony. As a general purpose device with up to 42 programmable General Purpose I/O (GPIO) pins, this processor provides a great deal of flexibility making it a good fit in the architecture for this application. The DSP56301 runs at 80 MIPS using an internal 80 MHz clock. It uses 3V logic and 24-bit addressing. On-chip memory consists of 4096×24 Program RAM (or the cache option can be selected, giving a 1024×24 bit instruction cache and a 3072×24 bit Program RAM), and two data RAM spaces (X and Y) as 2048×24 bit data RAM.

When the countermeasure 10 operates in the transmit mode, the DSP 68 provides a digital signal to a DAC 70 that converts the digital signals into corresponding analog signals. The DAC 70 may be a model number ML2375 DAC chip manufactured by Micro Linear Corporation. Chip capabilities include a 10-bit A/D converter, a 10-bit D/A converter, an 8-bit D/A converter and a four channel multiplexer. Signals output from the DAC 70 are amplified by an amplifier 72 that is preferably a pulse width modulating (PWM) amplifier. The PWM amplifier 72 makes efficient use of the available power by using a digital signal to approximate the analog signal. Pulse width modulation maintains longer "high" pulses when the signal amplitude is high and shortens the pulse when the signal amplitude is low.

A suitable PWM amplifier 72 is commercially available as amplifier model number SAO7 from Apex MicroTechnology. This is a 40 volt, 500 kHz PWM amplifier requiring a power source of between 10 and 16 volts. It is designed for a wide variety of applications including high fidelity audio equipment, brush type motor control and vibration canceling amplifiers. This amplifier has a full-bridge output circuit that is capable of providing a continuous 5 amp output current to a step-up transformer 74 that drives the transducer 60.

Figure 5:
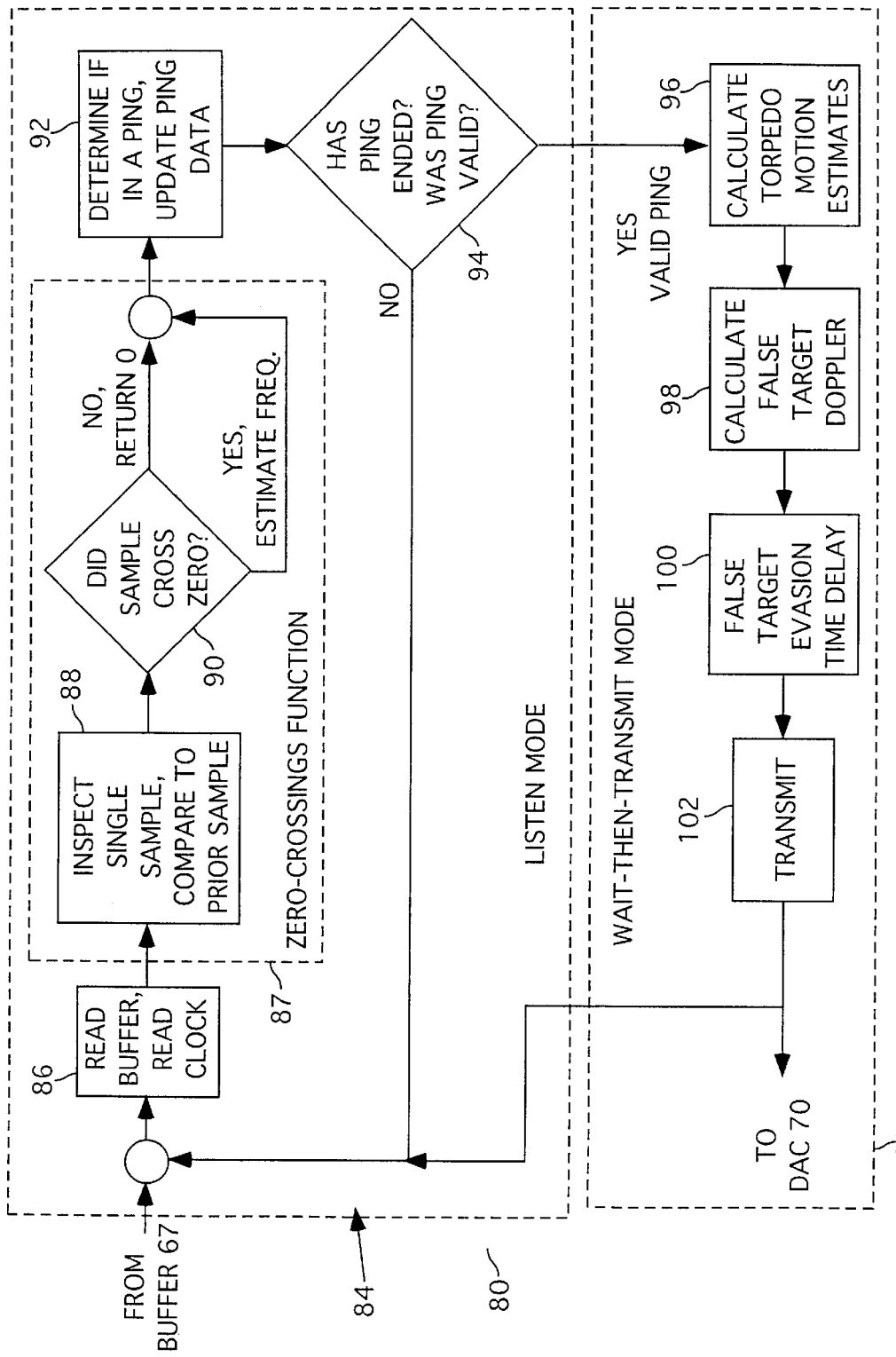
FIG. 5 is a signal flow diagram for the circuitry of FIG. 4.

FIG. 5 illustrates a logic flow diagram for the DSP 68 circuitry of FIG. 4. FIG. 5 shows a first group of logic steps identified as a listen mode 80 and a wait-then transmit-mode 82.

The listen mode 80 includes a do loop 84 that continues until a valid ping has been received. Signals from the buffer 67 are read in a read step 86 that also reads a time corresponding to the buffer signal value. The signal is then processed by a zero crossings function 87 that includes an inspect and compare step 88 that compares the incoming sample to the preceding sample. The DSP 68 then performs a zero crossing test step 90 to determine if the buffer signal crossed zero between the present sample and the preceding sample. If the signal crossed zero, the frequency of the signal is estimated. If the data point did not cross zero since the last stored point, a value of zero is returned for the frequency.

The DSP 68 next executes a ping determination step 92 to determine whether the signal represents a ping. Receiving a signal in the proper frequency range is not sufficient to establish that the signal represents a sonar ping. Several signal samples must be processed to determine if their frequencies are similar and thus part of a sonar ping. The DSP 68 next performs a step 94 to determine whether the ping has ended and whether the ping was valid. After a ping has been verified, it is assumed to have ended when subsequent signals have frequencies that are not in the proper frequency band. After the ping ends, its length is calculated.

After the end of a valid ping, the DSP 68 performs a calculate torpedo motion estimate step 96. The DSP 68 then executes a calculate false target Doppler step 98 in which the frequency of the decoy signal is calculated. The DSP 68 also executes a false target evasion time delay step 100 in which the proper time for sending the return pulse is calculated. At the appropriate time, the DSP 68 executes a transmit step 102 in which it sends a signal to the DAC 70 that results in the return pulse being transmitted by the transducer 60.

The structures and methods disclosed herein illustrate the principles of the present invention. The invention may be embodied in other specific forms without departing from its spirit or essential characteristics. The described embodiments are to be considered in all respects as exemplary and illustrative rather than restrictive. Therefore, the appended claims rather than the foregoing description define the scope of the invention. All modifications to the embodiments described herein that come within the meaning and range of equivalence of the claims are embraced within the scope of the invention.

What is claimed is:

1. A method for producing a decoy signal to enable a target to avoid a homing torpedo that uses a sonar ping signal for homing in on the target, comprising the steps of:

receiving sonar signals with a transducer that produces electrical signals corresponding to the sonar signals;

determining whether the electrical signals have frequencies that are within a defined frequency range;

processing the electrical signals to determine whether they correspond to sonar ping signals;

calculating an estimate of the torpedo's motion;

calculating a transmit time for transmitting a decoy signal;

calculating a Doppler frequency for the decoy signal such that the decoy signal will appear to the homing torpedo to be a return pulse from the target; and switching the transducer to a transmit mode to transmit the decoy signal having the calculated Doppler frequency at the calculated transmit time.

2. The method of claim 1 wherein the step of determining whether the electrical signals have frequencies that are within a defined frequency range includes the steps of:

sampling the electrical signals;

recording a time for each sample of the electrical signals;

comparing an incoming sample to the preceding sample;

determining whether the signal crossed zero during the time between the incoming sample and the preceding sample; and determining a time interval between successive zero crossings.

* * * * *